US008436850B2

(12) United States Patent
Kim et al.

(10) Patent No.: US 8,436,850 B2
(45) Date of Patent: May 7, 2013

(54) PIXEL AND ORGANIC LIGHT EMITTING DISPLAY DEVICE HAVING THE SAME

(75) Inventors: Chang-Yeop Kim, Yongin (KR); Won-Kyu Kwak, Yongin (KR); Mi-Hae Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 243 days.

(21) Appl. No.: 12/870,750

(22) Filed: Aug. 27, 2010

(65) Prior Publication Data

US 2011/0148855 A1 Jun. 23, 2011

(30) Foreign Application Priority Data

Dec. 21, 2009 (KR) ........................ 10-2009-0128121

(51) Int. Cl.
*G09G 5/00* (2006.01)
*G06F 3/041* (2006.01)

(52) U.S. Cl.
USPC ........................................... 345/214; 345/178

(58) Field of Classification Search .................... 345/76, 345/214, 211, 212
See application file for complete search history.

(56) References Cited

U.S. PATENT DOCUMENTS

2007/0075937 A1* 4/2007 Kim ................................ 345/76
2009/0213046 A1* 8/2009 Nam ................................ 345/76

FOREIGN PATENT DOCUMENTS

KR 10-2003-0035219 A 5/2003
KR 10-2005-0111922 A 11/2005
KR 10-2007-0049741 5/2007
KR 10-2007-0072208 7/2007
KR 100739335 B1 7/2007
KR 100846984 B1 7/2008

OTHER PUBLICATIONS

Office action dated Apr. 21, 2011 for the corresponding Korean priority application No. 10-2009-0128121; 1 page.

* cited by examiner

*Primary Examiner* — Michael Faragalla
(74) *Attorney, Agent, or Firm* — Christie, Parker & Hale, LLP

(57) ABSTRACT

A pixel including a boosting capacitor, wherein the boosting capacitor includes: a semiconductor layer, a first conductive layer overlapping the semiconductor layer at an overlapping portion, and a first insulating film therebetween, and wherein the semiconductor layer includes: a main body portion, a contact portion outside the overlapping portion and coupling the boosting capacitor with another component, and a connecting portion integrally provided with the main body portion and the contact portion to couple the main body portion with the contact portion at an interface of the first conductive layer and having a width smaller than that of the main body portion and the contact portion.

15 Claims, 5 Drawing Sheets

FIG. 6

| CD bias applied(one side) | 0um | −0.1um | −0.2um | −0.3um | −0.4um | −0.5um |
|---|---|---|---|---|---|---|
| Capacitance(pF) | 0.0548 | 0.0547 | 0.0546 | 0.0544 | 0.0543 | 0.0541 |
| Change in capacitance(%) | 0.00% | −0.18% | −0.36% | −0.73% | −0.91% | −1.28% |
| Overlay applied(Y side) | 0um | +0.2um | +0.4um | +0.6um | +0.8um | +1.0um |
| Capacitance(pF) | 0.0582 | 0.0585 | 0.0587 | 0.059 | 0.0593 | 0.0597 |
| Change in capacitance(%) | 0.00% | 0.52% | 0.86% | 1.37% | 1.89% | 2.58% |

FIG. 7A

| CD bias applied | RGB electric current | 0um | −0.1um | −0.2um | −0.3um | −0.4um | −0.5um |
|---|---|---|---|---|---|---|---|
| Change in electric current (%) | I_R | 0.00% | 0.76% | 1.53% | 3.08% | 3.70% | 5.27% |
| | I_G | 0.00% | 0.73% | 1.46% | 2.94% | 3.59% | 5.09% |
| | I_B | 0.00% | 0.59% | 1.19% | 2.39% | 2.94% | 4.16% |

FIG. 7B

| Overlay applied | RGB electric current | +0um | +0.2um | +0.4um | +0.6um | +0.8um | +1.0um |
|---|---|---|---|---|---|---|---|
| Change in electric current (%) | I_R | 0.00% | −2.94% | −5.13% | −7.84% | −10.74% | −14.96% |
| | I_G | 0.00% | −2.96% | −5.15% | −7.88% | −10.79% | −15.02% |
| | I_B | 0.00% | −2.43% | −4.24% | −6.50% | −8.93% | −12.49% |

FIG. 7C

| CD bias and overlay applied | CD bias | Overlay | CD bias | Overlay | CD bias | Overlay | CD bias | Overlay | CD bias | Overlay |
|---|---|---|---|---|---|---|---|---|---|---|
| | -0.5um | -0.4um | -0.25um | -0.4um | -0.14um | 0um | -0.25um | 0.4um | -0.5um | 0.4um |
| Change in electric current (%) | 4.32% | | 7.52% | | 0.00% | | -5.73% | | -8.66% | |
| | 4.45% | | 7.60% | | 0.00% | | -5.72% | | -8.60% | |
| | 3.54% | | 6.15% | | 0.00% | | -4.75% | | -7.20% | |

PIXEL AND ORGANIC LIGHT EMITTING DISPLAY DEVICE HAVING THE SAME

CROSS-REFERENCE TO RELATED APPLICATIONS

This application claims priority to and the benefit of Korean Patent Application No. 10-2009-0128121, filed on Dec. 21, 2009, in the Korean Intellectual Property Office, the entire content of which is incorporated herein by reference.

BACKGROUND

1. Field

Aspects of embodiments of the present invention relate to a pixel and an organic light emitting display device having the pixel.

2. Description of Related Art

Organic light emitting display devices are a type of flat panel display device using an organic compound as a light emitting material, which are thin and light and can be driven by low power, as well as having good luminance and color purity, such that they can be used in various display devices, including portable display devices.

Such organic light emitting display devices have a plurality of pixels including an organic light emitting diode, which is an element that self-emits light. Further, in active organic light emitting display devices, each pixel is provided with a plurality of transistors and capacitors to drive the organic light emitting diode.

Here, a storage capacitor that stores data signals and a boosting capacitor that performs a boosting operation in accordance with changes in voltage of a signal line to display more accurate gradation are utilized in each pixel. The luminance of each pixel provided with the storage capacitor and the boosting capacitor depends on the capacitance ratio of these two capacitors.

Therefore, the capacitance ratio of the storage capacitor and the boosting capacitor should be kept uniform in all of the pixels to implement uniform luminance.

However, the boosting capacitor is generally designed to be smaller in capacity (or capacitance) than the storage capacitor, such that changes in accordance with process variations increase relatively (or are more significant for the smaller boosting capacitor). In this case, a luminance difference may occur due to differences in capacitance, between the boosting capacitors in the different pixels.

SUMMARY

Aspects of embodiments of the present invention are directed toward a pixel capable of reducing a difference in capacitance of capacitors in the pixel and an organic light emitting display device having the pixel.

An embodiment of the present invention provides a pixel including: an organic light emitting diode coupled between a first power supply and a second power supply; a first transistor coupled between the first power supply and the organic light emitting diode and of which a gate electrode of the first transistor is coupled to a first node; a second transistor coupled between a first electrode of the first transistor and a data line and of which a gate electrode of the second transistor is coupled to a current scanning line; a storage capacitor coupled between the first power supply and the first node; and a boosting capacitor coupled between the first node and the current scanning line, wherein the boosting capacitor includes: a semiconductor layer, a first conductive layer overlapping the semiconductor layer at an overlapping portion, and a first insulating film therebetween, and wherein the semiconductor layer includes: a main body portion, a contact portion outside the overlapping portion and coupling the boosting capacitor with another component, and a connecting portion integrally provided with the main body portion and the contact portion to couple the main body portion with the contact portion at an interface of the first conductive layer and having a width smaller than that of the main body portion and the contact portion.

The semiconductor layer may be formed to have a hammer shape with a head portion, a handle portion, and a shank portion coupling the head portion with the handle portion, wherein the main body portion and the contact portion are formed corresponding to the head and handle portions of the hammer shape, respectively, and the connecting portion is formed corresponding to the shank portion coupling the head portion with the handle portion.

The contact portion may have a width larger than that of the connecting portion and smaller than that of the main body portion.

The boosting capacitor may be electrically coupled with the storage capacitor through the contact portion.

The first conductive layer may cover the entire upper portion of the main body portion of the semiconductor layer.

The boosting capacitor may further include a second conductive layer overlapping a portion of the first conductive layer, with a second insulating film between the first conductive layer and the second conductive layer.

The second conductive layer may be electrically coupled to the semiconductor layer via a contact hole through the contact portion.

The second conductive layer of the boosting capacitor may include the same material as source and drain electrodes of the first and second transistors.

The semiconductor layer of the boosting capacitor may include the same material as semiconductor layers of the first and second transistors, and the first conductive layer may include the same material as the gate electrodes of the first and second transistors.

The pixel may further include: a third transistor coupled between the gate electrode and a second electrode of the first transistor and of which a gate electrode of the third transistor is coupled to the current scanning line; a fourth transistor coupled between the first power supply and the first transistor and of which a gate electrode of the fourth transistor is coupled to a light emitting control line; and a fifth transistor coupled between the first transistor and the organic light emitting diode and of which a gate electrode of the fifth transistor is coupled to the light emitting control line; and a sixth transistor that is coupled between the first node and an initialization power supply and of which a gate electrode of the sixth transistor is coupled to a previous scanning line.

Another embodiment of the present invention provides an organic light emitting display device, including: a plurality of pixels at crossing regions of scanning lines and data lines; a scanning driving unit for supplying scanning signals to the scanning lines; and a data driving unit for supplying data signals to the data lines, wherein each of the pixels includes: an organic light emitting diode coupled between a first power supply and a second power supply; a first transistor coupled between the first power supply and the organic light emitting diode and of which a gate electrode of the first transistor is coupled to a first node; a second transistor coupled between a first electrode of the first transistor and a data line and of which a gate electrode of the second transistor is coupled to a current scanning line; a storage capacitor coupled between the first power supply and the first node; and a boosting capacitor coupled between the first node and the current scanning line, wherein the boosting capacitor includes: a semiconductor layer, a first conductive layer overlapping the semiconductor layer at an overlapping portion, and a first insulating film therebetween, and wherein the semiconductor layer includes: a main body portion, a contact portion outside the overlapping portion and coupling the boosting capacitor with another component, and a connecting portion integrally provided with the main body portion and the contact portion to couple the main body portion with the contact portion at an interface of the first conductive layer and having a width smaller than that of the main body portion and the contact portion.

According to an embodiment of the present invention, it is possible to reduce a luminance difference in accordance with a difference in capacitances by forming the boosting capacitor in the pixel such that the difference in capacitances due to the area differences and/or the position differences in the process reduces.

BRIEF DESCRIPTION OF THE DRAWINGS

The accompanying drawings, together with the specification illustrate exemplary embodiments of the present invention, and, together with the description, serve to explain the principles of the present invention.

FIG. 6 is a table showing changes in capacitance in accordance with area differences and position differences of the boosting capacitor shown in FIG. 5.

FIGS. 7A, 7B, and 7C are tables showing changes in electric current of pixels in accordance with area differences and position differences of the boosting capacitor shown in FIG. 5.

DETAILED DESCRIPTION

Figure 1:
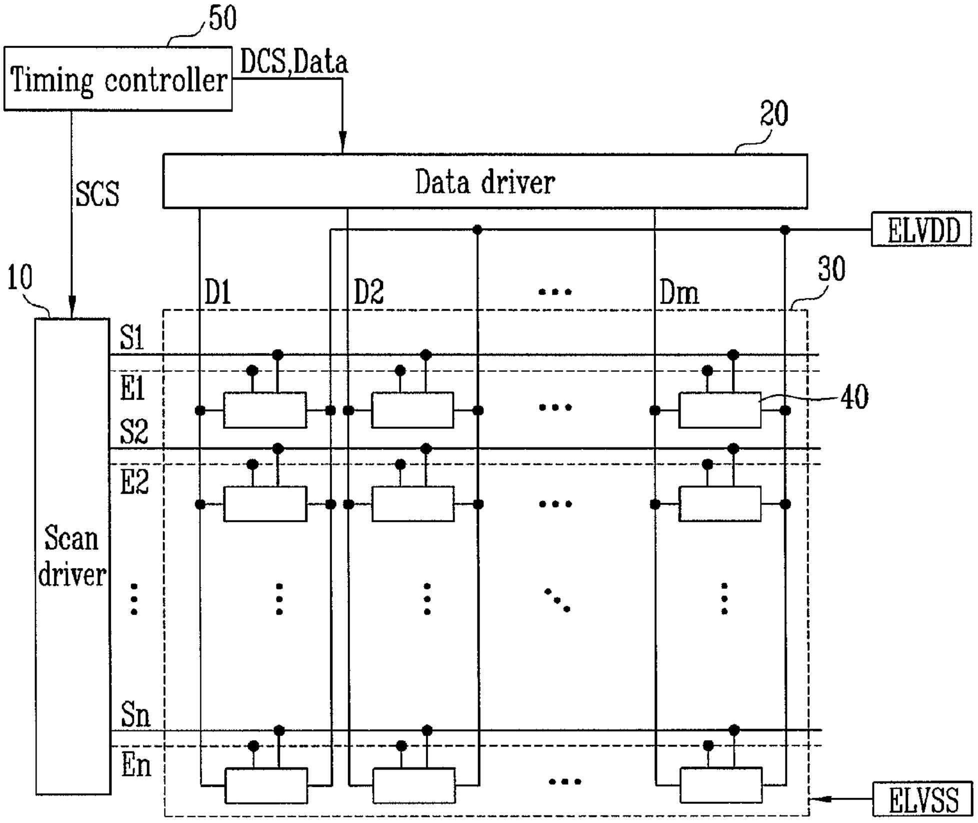
FIG. 1 is a block diagram illustrating an organic light emitting display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being “on” another element, it can be directly on the another element or be indirectly on the another element with one or more intervening elements interposed therebetween. Also, when an element is referred to as being “connected to” or “coupled to” another element, it can be directly connected or coupled to the another element or be indirectly connected or coupled to the another element with one or more intervening elements interposed therebetween. Hereinafter, like reference numerals refer to like elements.

Embodiments of the present invention will be described hereafter in detail with reference to the accompanying drawings.

FIG. 1 is a block diagram illustrating an organic light emitting display device according to an embodiment of the present invention.

Referring to FIG. 1, an organic light emitting display device according to an embodiment of the present invention includes a pixel unit (or display unit) 30 that includes a plurality of pixels 40 positioned at crossing regions of scanning lines S1 to Sn and data lines D1 to Dm, a scanning driving unit 10 that supplies scanning signals to the scanning lines S1 to Sn, a data driving unit 20 that supplies data signals to the data lines D1 to Dm, and a timing control unit 50 that controls the scanning driving unit 10 and the data driving unit 20.

The scanning driving unit 10 generates scanning signals in response to scanning driving control signals SCS supplied from the timing control unit 50 and then sequentially supplies the generated scanning signals to the scanning lines S1 to Sn. Further, when the pixels 40 are controlled to emit light by light emitting control signals, the scanning driving unit 10 generates the light emitting control signals in response to the scanning driving control signals SCS and then sequentially supplies the generated light emitting control signals to light emitting control lines E1 to En.

The data driving unit 20 generates data signals in response to data driving control signals DCS supplied from the timing control unit 50 and then supplies the generated data signals to the data lines D1 to Dm.

The timing control unit 50 generates the data driving control signals DCS, and the scanning driving control signals SCS in response to synchronizing signals that are supplied from the outside. The data driving control signals DCS generated by the timing control unit 50 are supplied to the data driving unit 20, and the scanning driving control signals SCS are supplied to the scanning driving unit 10. Further, the timing control unit 50 rearranges data Data that is supplied from the outside, and supplies it to the data driving unit 20.

The pixel unit 30 receives a first power of a first power supply ELVDD and a second power of a second power supply ELVSS from the outside and supplies them to each of the pixels 40. In this configuration, the first power supply ELVDD may be a high-electric potential power supply, and the second power source ELVSS may be a low-electric potential power supply.

Each of the pixels 40 includes an organic light emitting diode and is coupled to a corresponding current scanning line of the scanning lines extending in rows and a corresponding data line of the data lines extending in columns. Further, each pixel 40 may be further coupled to a corresponding light emitting control line of the light emitting control lines or a previous scanning line of the scanning lines extending in a previous row, in accordance with the internal structure.

The pixels 40 control the amount of electric current flowing from the first power supply ELVDD to the second power supply ELVSS through the organic light emitting diodes, in response to data signals that are supplied through the data lines when scanning signals are supplied from the current scanning lines. The luminance of the pixels 40 depends on the amount of electric current flowing in response to the data signals.

Figure 2:
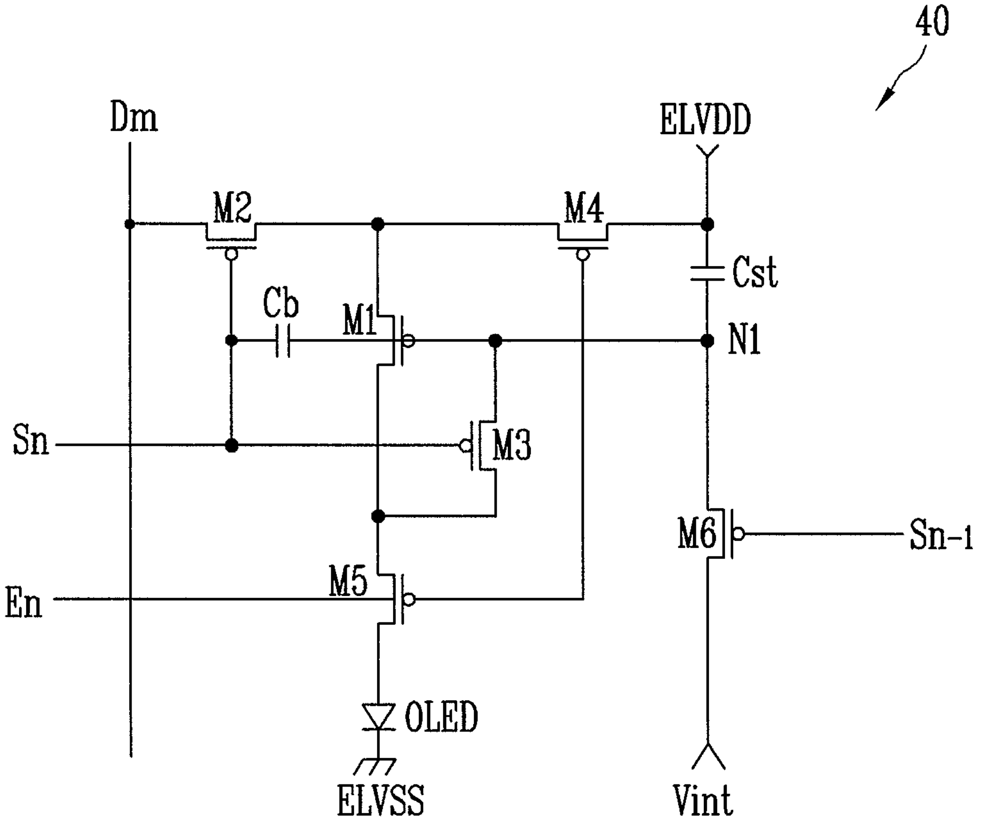
FIG. 2 is a circuit diagram illustrating an example of a pixel according to an embodiment of the present invention.

FIG. 2 is a circuit diagram illustrating an example of a pixel according to an embodiment of the present invention. The pixel shown in FIG. 2 is applicable to the organic light emitting display device shown in FIG. 1. For the convenience, the pixel shown in FIG. 2 is assumed to be coupled to n-th scanning line Sn and m-th data line Dm.

Referring to FIG. 2, a pixel 40 according to an embodiment of the present invention includes an organic light emitting diode OLED that is coupled between a first power supply ELVDD and a second power supply ELVSS, a first transistor M1 that is coupled between the first power supply ELVDD and the organic light emitting diode OLED and of which the gate electrode of the first transistor M1 is coupled to a first node N1, a second transistor M2 that is coupled between the first electrode of the first transistor M1 and the data line Dm of which the gate electrode of the second transistor M2 is coupled to the current scanning line Sn, a storage capacitor Cst that is coupled between the first power supply ELVDD and the first node N1, and a boosting capacitor Cb that is coupled between the first node N1 and the current scanning line Sn.

Further, the pixel 40 according to this embodiment may further include a third transistor M3 that is coupled between the gate electrode and the second electrode of the first transistor M1 and of which the gate electrode of the third transistor M3 is coupled to the current scanning line Sn, a fourth transistor M4 that is coupled between the first power supply ELVDD and the first transistor M1 and of which the gate electrode of the fourth transistor M4 is coupled to a light emitting control line En, a fifth transistor M5 that is coupled between the first transistor m1 and the organic light emitting diode OLED and of which the gate electrode of the fifth transistor M5 is coupled to the light emitting control line En, and a sixth transistor M6 that is coupled between a first node N1 and an initialization power supply Vint and of which the gate electrode of the sixth transistor M6 is coupled to a previous scanning line Sn−1.

In more detail, the anode electrode of the organic light emitting diode OLED is coupled to the first power supply ELVDD through the first, fourth, and fifth transistors M1, M4, and M5, and the cathode electrode is coupled to the second power supply ELVSS. The organic light emitting diode OLED generates red, green, or blue light with luminance corresponding to the amount of electric current supplied from the first transistor M1.

The first electrode of the first transistor M1 is coupled to the first power supply ELVDD through the fourth transistor M4, and the second electrode of the first transistor M1 is coupled to the organic light emitting diode OLED through the fifth transistor M5. In this configuration, the first electrode and the second electrode of the first transistor M1 are different electrodes. For example, assuming that the first electrode of the first transistor M1 is a source electrode, the second electrode of the first transistor M1 is a drain electrode. Further, the gate electrode of the first transistor M1 is coupled to the first node N1. The first transistor M1 having the above configuration supplies electric current corresponding to the voltage charged in the storage capacitor Cst, that is, the voltage applied to the first node N1.

The first electrode of the second transistor M2 is coupled to the data line Dm, and the second electrode of the second transistor M2 is coupled to the first electrode of the first transistor M1. Further, the gate electrode of the second transistor M2 is coupled to the current scanning line Sn. The second transistor M2 having the above configuration is turned on and supplies a data signal supplied from the data line Dm to the first electrode of the first transistor M1, when the current scanning signal is supplied from the current scanning line Sn.

The first electrode of the third transistor M3 is coupled to the second electrode of the first transistor M1 and the second electrode of the third transistor M2 is coupled to the gate electrode of the first transistor M1. Further, the gate electrode of the third transistor M3 is coupled to the current scanning line Sn. The third transistor M3 having the above configuration is turned on and couples the first transistor M1 in the form of a diode when the current scanning signal is transmitted from the current scanning line Sn. That is, the first transistor M1 is coupled in the form of a diode, when the third transistor M3 is turned on.

The first electrode of the fourth transistor M4 is coupled to the first electrode ELVDD, and the second electrode of the fourth transistor M4 is coupled to the first electrode of the first transistor M1. Further, the gate electrode of the fourth transistor M4 is coupled to the light emitting control line En. The fourth transistor M4 having the above configuration is turned off and insulates the first transistor M1 from the first power supply ELVDD when a high-level light emitting control signal is supplied from the light emitting control line En, and is then turned on and electrically couples the first transistor M1 with the first power supply ELVDD when the supply of the light emitting control signal is stopped (that is, the voltage level of the light emitting control signal drops to a low level).

The first electrode of the fifth transistor M5 is coupled to the second electrode of the first transistor M1, and the second electrode of the fifth transistor M5 is coupled to the organic light emitting diode OLED. Further, the gate electrode of the fifth transistor M5 is coupled to the light emitting control line En. The fifth transistor M5 having the above configuration is turned off and insulates the first transistor M1 from the organic light emitting diode OLED when a high-level light emitting control signal is supplied from the light emitting control line En, and then is turned on and electrically couples the first transistor M1 with the organic light emitting diode OLED when the supply of the light emitting control signal is stopped.

The first electrode of the sixth transistor M6 is coupled to the first node N1, and the second electrode of the sixth transistor M6 is coupled to the initialization power supply Vint. Further, the gate electrode of the sixth transistor M6 is coupled to the previous scanning line Sn−1. The sixth transistor M6 having the above configuration is turned on and initializes the first node N1 when the previous scanning signal is transmitted from the previous scanning line Sn−1. For this operation, the voltage value of the initialization power supply Vint is set lower than the voltage value of the data signal.

On the other hand, although the first to sixth transistors M1 to M6 are shown as P-type MOSFETs in FIG. 2, the present invention is not limited thereto. However, when the first to sixth transistors M1 to M6 are N-type MOSFETs, the polarity of the driving waveform is suitably inverted.

The storage capacitor Cst is coupled between the first power supply ELVDD and the first node N1. The storage capacitor Cst is initialized by the initialization power source Vint during a period when the previous scanning signal is supplied, and is charged to correspond to the threshold voltage of the first transistor M1, together with the data signal, during a period when the current scanning signal is supplied.

The boosting capacitor Cb is coupled between the first node N1 and the current scanning line Sn. The boosting capacitor Cb changes the voltage of the first node N1 through coupling when the voltage level of the current scanning signal supplied from the current scanning line Sn changes. In particular, the boosting capacitor Cb increases the voltage of the first node N1, corresponding to the increase of the current scanning signal, when the supply of the current scanning signal from the current scanning line Sn is stopped, that is, the voltage level of the current scanning signal changes from a low level to a high level. As described above, as the voltage of the first node N1 increases, black gradation (including other gradation) can be accurately displayed.

Figure 3:
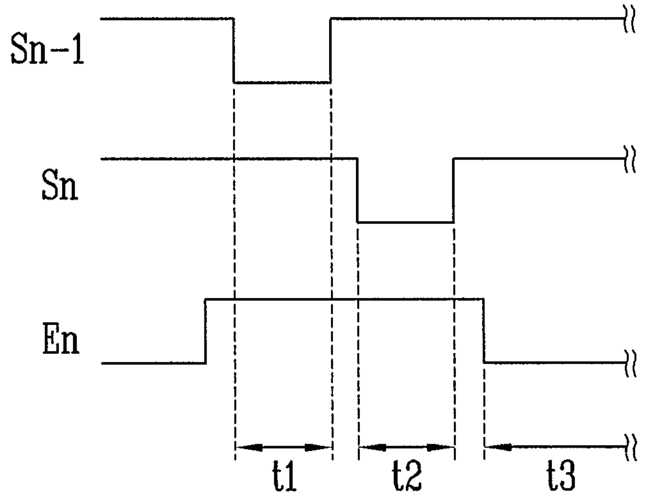
FIG. 3 is a waveform diagram illustrating a method of driving the pixel shown in FIG. 2.

FIG. 3 is a waveform diagram illustrating a method of driving the pixel shown in FIG. 2.

Referring to FIG. 3, a low-level previous scanning signal and a low-level current scanning signal are sequentially supplied from the previous scanning line Sn−1 and the current scanning line Sn, respectively, in the periods of t1 and t2. Further, a high-level light emitting control signal is supplied to the light emitting control line En in the period where the previous scanning signal and the current scanning signal are supplied, and the voltage level of the light emitting control signal changes to a low level, after the supply of the current scanning signal is finished.

The operational process of the pixel 40 shown in FIG. 2 is described hereafter in connection with FIGS. 2 and 3.

First, when the previous scanning signal is supplied to the previous scanning line Sn−1 during the period t1, the sixth transistor M6 is turned on. As the sixth transistor M6 is turned on, the first node N1 is coupled with the initialization power supply Vint and initialized. Accordingly, the voltage that has been charged in the storage capacitor Cst in the previous frame period is initialized.

Thereafter, when the current scanning signal is supplied to the current scanning line Sn in the period of t2, the second and third transistors M2 and M3 are turned on. In this process, the first transistor M1 is coupled in the form of a diode and turned on by the third transistor M3. Accordingly, a data signal is supplied to the first node N1 from the data line Dm through the second transistor M2, the first transistor M1, and the third transistor M3. In this process, voltage corresponding to the data signal is charged in the storage capacitor Cst. In this state, since the first transistor M1 is diode-connected, voltage corresponding to the threshold voltage of the first transistor M1 is additionally charged in the storage capacitor Cst, in addition to the voltage corresponding to the data signal.

Thereafter, when the supply of the current scanning signal from the current scanning line Sn is stopped, the voltage of the first node N1 is increased by the boosting capacitor Cb. As the voltage of the first node N1 increases, it is possible to compensate for the voltage that is lower than a desired voltage charged in the storage capacitor Cst by charge sharing of the boosting capacitor Cb and the storage capacitor Cst, which is generated by the data line Dm. That is, it is possible to accurately display black gradation (including other gradation) by employing the boosting capacitor Cb.

Thereafter, the voltage level of a light emitting control signal from the light emitting control line En changes to a low level upon start with the period of t3. Accordingly, the fourth and fifth transistors M4 and M5 are turned on and electric current corresponding to the voltage charged in the storage capacitor Cst is supplied to the organic light emitting diode OLED. In the process, the organic light emitting diode emits light with luminance corresponding to the strength of electric current flowing through itself.

Figure 4:
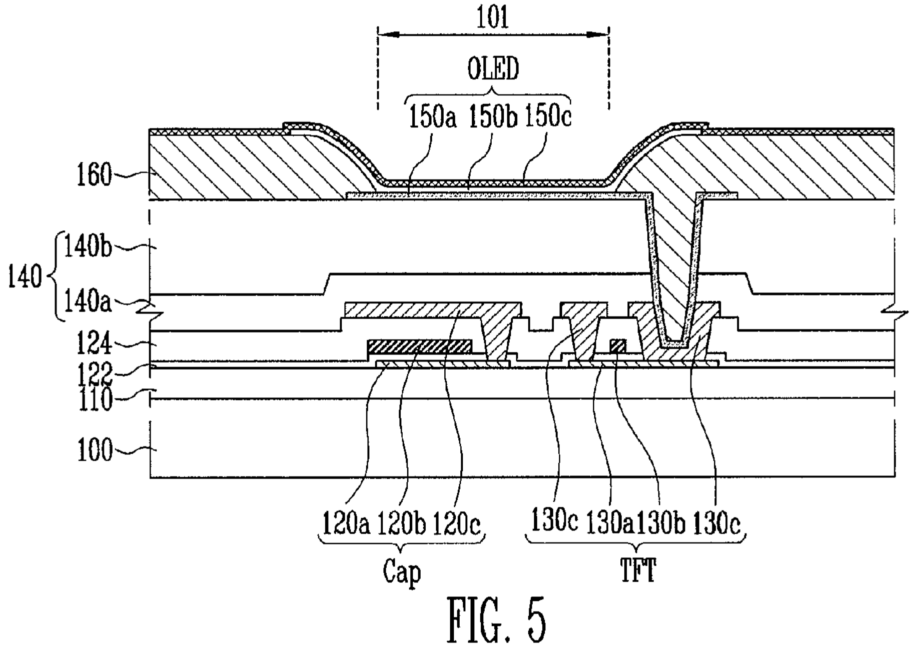
FIG. 4 is a cross-sectional view showing parts of a pixel according to an embodiment of the present invention.

FIG. 4 is a cross-sectional view showing the main parts of a pixel according to an embodiment of the present invention. For the convenience, FIG. 4 shows one thin film transistor TFT and one capacitor Cap, including an organic light emitting diode OLED.

In this configuration, the thin film transistor TFT is provided to show the structure of the first to sixth transistors M1 to M6 shown in FIG. 2, particularly, a transistor coupled with the organic light emitting diode OLED, that is, the fifth transistor M5 is shown by way of an example. However, it should be understood that the other transistors can be implemented the same as (or similarly to) the fifth transistor M5 in the basic structure, except for the position or connection relationships.

Further, the capacitor Cap is provided to show the structure of the storage capacitor Cst and the boosting capacitor Cb shown in FIG. 2, and it should be also understood that the storage capacitor Cst and the boosting capacitor Cb can be implemented basically with the same (or a similar) structure, except for the position or connection relationships. Therefore, the capacitor Cap of FIG. 4 may be considered as either the storage capacitor Cst or boosting capacitor Cb. However, in this embodiment, although the capacitor is shown to have a dual structure, the present invention is not limited thereto. For example, the capacitor Cap may be implemented by only two conductive layers with an insulating film therebetween.

Referring to FIG. 4, a pixel includes a capacitor Cap and a thin film transistor TFT formed on a buffer layer 110 over a substrate 100, a planarization film 140 formed over the capacitor Cap and the thin film transistor TFT, and an organic light emitting diode OLED formed on the planarization film 140 and electrically coupled with the thin film transistor TFT through a via-hole formed through the planarization film 140.

The capacitor Cap includes a semiconductor layer 120*a* that is formed on the buffer layer 110, a first conductive layer 120*b* that is formed to overlap a portion of the semiconductor layer 120*a* with a first insulating film 122 therebetween, a second conductive layer 120*c* that is formed to overlap a portion of the first conductive layer 120*b* with a second insulating film 124 therebetween and coupled with the semiconductor layer 120*a* through a via-hole.

The semiconductor layer 120*a* can be simultaneously (or concurrently) formed in the process of forming the thin film transistor TFT and a semiconductor layer 130*a*. That is, the semiconductor layer 120*a* can be made of the same material as the semiconductor layer 130*a* of the thin film transistor TFT on the same layer. The fact that the semiconductor layer 120*a* and the thin film transistor TFT are made of the same material as the semiconductor layer 130*a* does not imply only that they are configured with the same composition and components. For example, depending on the design, the semiconductor layer 120*a* may further include dopant that is not included in the semiconductor layer 130*a* of the thin film transistor TFT, or may include the same dopant as the semiconductor layer 130*a* of the thin film transistor TFT, which may have dopant doped with different densities.

Further, the first conductive layer 120*b* can be made of a gate metal, and the second conductive layer 120*c* can be made of a source and drain metal, and these layers 120*b* and 120*c* can be simultaneously (or concurrently) formed with the process of forming a gate electrode 130*b*, and the source and drain electrode 130*c* of the thin film transistor TFT. That is, the first conductive layer 120*b* may be made of the same material as the gate electrode 130*b* of the thin film transistor TFT on the same layer, and the second conductive layer 120*c* may be made of the same material as the source and drain electrode of the thin film transistor TFT on the same layer.

Here, simultaneously (or concurrently) forming the capacitor Cap and the thin film transistor TFT is for convenience of process, and the present invention is not limited thereto.

In addition, the thin film transistor TFT includes the semiconductor layer 130*a* formed on the buffer layer 110, the gate electrode 130*b* formed on the semiconductor layer 130*a* with the first insulating film 122 therebetween, and the source and drain electrode 130*c* formed on the gate electrode 130*b* with the second insulating film 124 therebetween and coupled with the semiconductor layer 130*a* through a contact hole.

An insulating planarization film 140 is formed over the capacitor Cap and the thin film transistor TFT. The planarization film 140 may be formed in a multilayer structure including an organic/inorganic insulating film. For example, the planarization film 140 may include a first planarization film 140*a* that is an inorganic insulating film and a second planarization film 140*b* that is an organic insulating film.

A first electrode (e.g. the anode electrode) 150*a* of the organic light emitting diode OLED which is coupled with the thin film transistor TFT through a via-hole formed through the planarization film 140 is formed on the planarization film 140.

Further, a pixel defining film 160 that overlaps the upper portion of the edge of the first electrode 150*a* and exposes the first electrode 150*a* in a light emitting region 101 of the pixel is formed on the first electrode 150*a*.

An organic light emitting layer 150*b* of the organic light emitting diode OLED is formed on the exposed first electrode 150*a* and the pixel defining film 160, and a second electrode (e.g. the cathode electrode) 150*c* of the organic light emitting diode OLED is formed on the organic light emitting layer 150*b*.

Figure 5:
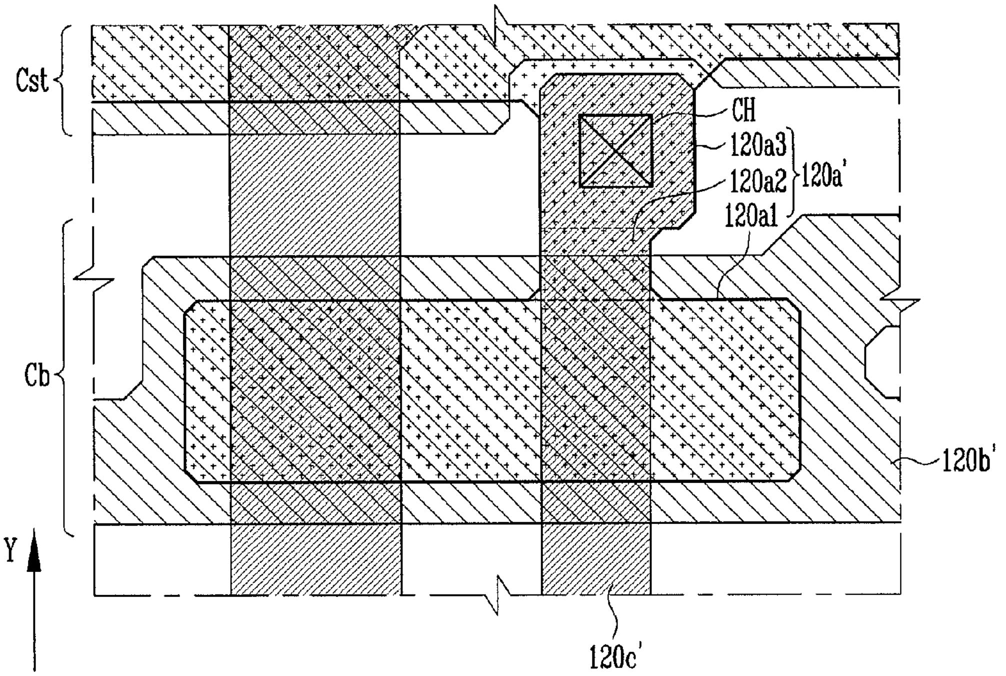
FIG. 5 is a plan view showing a layout of a boosting capacitor in a pixel according to an embodiment of the present invention.

FIG. 5 is a plan view showing the layout of a boosting capacitor in a pixel according to an embodiment of the present invention.

Referring to FIG. 5, the boosting capacitor Cb can be implemented by a semiconductor layer 120*a*', a first conductive layer 120*b*', and a second conductive layer 120*c*', which are stacked.

The semiconductor layer 120*a*' includes a main body portion 120*a*1 that is formed to have a large width throughout the region overlapping the first conductive layer 120*b*', a contact portion 120*a*3 that is positioned outside the region overlapping the first conductive layer 120*b*' and couples the boosting capacitor Cb with another component, for example, the storage capacitor Cst, and a connecting portion 120*a*2 that integrally couples the main body portion 120*a*1 with the contact portion 120*a*3 at the interface of the first conductive layer 120*b*'.

The main body portion 120*a*1 is a portion that occupies the majority of the region overlapping the first conductive layer 120*b*', and the majority of the capacitance of the boosting capacitor Cb is based on the main body portion 120*a*1.

Further, the connecting portion 120*a*2 is a portion that is positioned at the interface of the first conductive layer 120*b*', and a portion overlapping the first conductive layer 120*b*' contributes to the capacitance of the boosting capacitor Cb.

The contact portion 120*a*3 is a portion where the contact hole CH couples the semiconductor layer 120*a*' with the second conductive layer 120*c*', and for this configuration, is positioned in the region that does not overlap the first conductive layer 120*b*'. In this configuration, the boosting capacitor Cb having a dual structure is implemented by the contact portion 120*a*3, and for convenience, the contact portion 120*a*3 is considered as a portion of the boosting capacitor in an embodiment of the present invention. However, since the boosting capacitor Cb and the storage capacitor Cst are coupled by the contact portion 120*a*3, the contact portion 120*a*3 may be considered as a portion of the storage capacitor Cst, or the connection node between the boosting capacitor Cb and the storage capacitor Cst, in accordance with viewpoint.

However, in an embodiment of the present invention, the connecting portion 120*a*2 has a width smaller than the main body portion 120*a*1 and the contact portion 120*a*3. In particular, the main body portion 120*a*1 may have the largest width to ensure the capacity (or capacitance) of the boosting capacitor Cb, the contact portion 120*a*3 may have a width that is wide enough to form the contact hole, and the connecting portion 120*a*2 may have a width smaller than the width of the contact portion 120*a*3.

For example, the semiconductor layer 120*a*', as shown in FIG. 5, is formed to have a shape of a hammer (or to have a hammer shape), in which the main body portion 120*a*1 and the contact portion 120*a*3 may be formed in shapes corresponding to the head and the handle of the hammer, respectively, and the connecting portion 120*a*2 may be formed in a shape corresponding to the shank connecting the head with the handle.

When the semiconductor layer 120*a*' is formed in the hammer shape, as described above, it is possible to minimize or reduce a difference in capacitance due to an area difference and position difference that are caused (or created) in the process of forming the boosting capacitor Cb.

In more detail, the area difference or the position difference is easily generated in the process of patterning the first conductive layer 120*b*', but it is possible to minimize or reduce changes in capacitance of the boosting capacitor Cb by forming the first conductive layer 120*b*' to be wide enough to cover the entire upper portion of the main body portion 120*a*1 of the semiconductor layer 120*a*', and forming the width of the connecting portion 120*a*2 positioned at the interface of the first conductive layer 120*b*' to be smaller, such that only the overlap area with the connecting portion 120*a*2 changes even if an area difference or a position difference is generated in the process.

That is, in an embodiment of the present invention, the boosting capacitor Cb in the pixel is formed such that a difference in capacity (or capacitance) due to the area difference and the position difference in the process reduces.

The boosting capacitor Cb, as described above, increases the voltage of the first node N1 when the voltage level of the current scanning signal changes to a high level in the pixel having the structure shown in FIG. 2, in which the change amount of voltage of the first node N1 is determined by the capacitance ratio of the storage capacitor Cst and the boosting capacitor Cb.

In general, since the boosting capacitor Cb is smaller than the storage capacitor Cst, the changes in accordance with a process variation are relatively large in the boosting capacitor Cb.

Therefore, aspects of embodiments of the present invention reduce the differences in capacitances of the boosting capacitors in the pixels to reduce a difference in luminance between pixels, since the boosting capacitor Cb in the pixel is formed such that a difference in capacity (or capacitance) due to the area difference and the position difference in the process reduces.

The connecting portion 120*a*2 may be changed in width in accordance with the pixel design, and the width can be experimentally determined, considering the design space and required capacitance of the boosting capacitor Cb. Further, the length of the connecting portion 120*a*2 may be determined considering the margin region where the area difference and the position difference of the first conductive layer 120*b*' are generated.

FIGS. 6 to 7C show experiment data for proving effects of the present invention. FIG. 6 is a table showing changes in capacity (or capacitance) in accordance with the area difference and the position difference of the boosting capacitor shown in FIG. 5, and FIGS. 7A, 7B, and 7C are tables showing changes in electric current of pixels, by simulation, in accordance with the area difference and the position difference of the boosting capacitor shown in FIG. 5.

In FIGS. 6 to 7C, 'CD bias applied' indicates the area difference of the first conductive layer 120*b*', which was measured from one side.

For example, in FIG. 6, when the first conductive layer 120*b*' is patterned inward by 1 μm from one edge, the capacity (or capacitance) of the boosting capacitor reduces by 0.18%.

Further, in FIGS. 6 to 7C, 'overlay applied' indicates the position difference of the first conductive layer 120*b*', which was measured in Y-direction.

For example, in FIG. 6, when the first conductive layer 120*b*' is shifted (or increased) by 0.2 μm out or upward in the Y-direction and then patterned, the overlap area with the semiconductor layer 120*a*' increases, and the capacitance of the boosting capacitor increases by 0.52%.

Referring to FIG. 6, it can be seen that changes in capacitance in accordance with the area difference and the position difference of the boosting capacitor are minute.

Further, FIGS. 7A to 7C show data simulating electric current for each RGB pixel in accordance with the area difference and/or the position difference of the boosting capacitor. It can be also seen from FIGS. 7A to 7C that the RGB electric current difference is minute.

That is, as in embodiments of the present invention, by forming a boosting capacitor such that a difference in capacity (or capacitance) in accordance with an area difference and a position difference reduces, it is possible to reduce the RGB electric difference in accordance with the capacitance difference, thereby reducing the luminance difference.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising:

an organic light emitting diode coupled between a first power supply and a second power supply;

a first transistor coupled between the first power supply and the organic light emitting diode and of which a gate electrode of the first transistor is coupled to a first node;

a second transistor coupled between a first electrode of the first transistor and a data line and of which a gate electrode of the second transistor is coupled to a current scanning line;

a storage capacitor coupled between the first power supply and the first node; and a boosting capacitor coupled between the first node and the current scanning line, wherein the boosting capacitor comprises: a semiconductor layer, a first conductive layer overlapping the semiconductor layer at an overlapping portion, and a first insulating film therebetween, and wherein the semiconductor layer comprises: a main body portion, a contact portion outside the overlapping portion and coupling the boosting capacitor with another component, and a connecting portion integrally provided with the main body portion and the contact portion to couple the main body portion with the contact portion at an interface of the first conductive layer and having a width smaller than that of the main body portion and the contact portion.

2. The pixel of claim 1, wherein the semiconductor layer is formed to have a hammer shape with a head portion, a handle portion, and a shank portion coupling the head portion with the handle portion, wherein the main body portion and the contact portion are formed corresponding to the head and handle portions, respectively, and the connecting portion is formed corresponding to the shank portion.

3. The pixel of claim 1, wherein the contact portion has a width larger than that of the connecting portion and smaller than that of the main body portion.

4. The pixel of claim 1, wherein the boosting capacitor is electrically coupled with the storage capacitor through the contact portion.

5. The pixel of claim 1, wherein the first conductive layer covers the entire upper portion of the main body portion of the semiconductor layer.

6. The pixel of claim 1, wherein the boosting capacitor further comprises a second conductive layer overlapping a portion of the first conductive layer, with a second insulating film between the first conductive layer and the second conductive layer.

7. The pixel of claim 6, wherein the second conductive layer is electrically coupled to the semiconductor layer via a contact hole through the contact portion.

8. The pixel of claim 6, wherein the second conductive layer of the boosting capacitor comprises the same material as source and drain electrodes of the first and second transistors.

9. The pixel of claim 1, wherein the semiconductor layer of the boosting capacitor comprises the same material as semiconductor layers of the first and second transistors, and the first conductive layer comprises the same material as the gate electrodes of the first and second transistors.

10. The pixel of claim 1, further comprising:

a third transistor coupled between the gate electrode and a second electrode of the first transistor and of which a gate electrode of the third transistor is coupled to the current scanning line;

a fourth transistor coupled between the first power supply and the first transistor and of which a gate electrode of the fourth transistor is coupled to a light emitting control line; and a fifth transistor coupled between the first transistor and the organic light emitting diode and of which a gate electrode of the fifth transistor is coupled to the light emitting control line; and a sixth transistor that is coupled between the first node and an initialization power supply and of which a gate electrode of the sixth transistor is coupled to a previous scanning line.

11. An organic light emitting display device, comprising:

a plurality of pixels at crossing regions of scanning lines and data lines;

a scanning driving unit for supplying scanning signals to the scanning lines; and a data driving unit for supplying data signals to the data lines, wherein each of the pixels comprises:

an organic light emitting diode coupled between a first power supply and a second power supply;

a first transistor coupled between the first power supply and the organic light emitting diode and of which a gate electrode of the first transistor is coupled to a first node;

a second transistor coupled between a first electrode of the first transistor and a data line and of which a gate electrode of the second transistor is coupled to a current scanning line;

a storage capacitor coupled between the first power supply and the first node; and a boosting capacitor coupled between the first node and the current scanning line, wherein the boosting capacitor comprises: a semiconductor layer, a first conductive layer overlapping the semiconductor layer at an overlapping portion, and a first insulating film therebetween, and wherein the semiconductor layer comprises: a main body portion, a contact portion outside the overlapping portion and coupling the boosting capacitor with another component, and a connecting portion integrally provided with the main body portion and the contact portion to couple the main body portion with the contact portion at an interface of the first conductive layer and having a width smaller than that of the main body portion and the contact portion.

12. The organic light emitting display device of claim 11, wherein the semiconductor layer is formed to have a hammer shape with a head portion, a handle portion, and a shank portion coupling the head portion with the handle portion, wherein the main body portion and the contact portion are formed corresponding to the head and handle portions, respectively, and the connecting portion is formed corresponding to the shank portion.

13. The organic light emitting display device of claim 11, wherein the boosting capacitor is electrically coupled with the storage capacitor through the contact portion.

14. The organic light emitting display device of claim 11, wherein the first conductive layer covers the entire upper portion of the main body portion of the semiconductor layer.

15. The organic light emitting display device of claim 11, wherein the boosting capacitor further comprises a second conductive layer overlapping a portion of the first conductive layer, with a second insulating film between the first conductive layer and the second conductive layer, and the second conductive layer is electrically coupled to the semiconductor layer via a contact hole through the contact portion.

* * * * *